United States Patent [19]
Wallace

[11] 3,889,527
[45] June 17, 1975

[54] STEERING LINKAGE TESTING APPARATUS

[76] Inventor: Virgil T. Wallace, Box 831, Gladewater, Tex. 75647

[22] Filed: Apr. 4, 1974

[21] Appl. No.: 458,057

[52] U.S. Cl. ............... 73/118; 33/180 AT; 33/203; 33/333
[51] Int. Cl. .......................................... G01m 17/06
[58] Field of Search .......... 73/118; 33/1 N, 180 AT, 33/203, 335, 336

[56] References Cited
UNITED STATES PATENTS

| | | | |
|---|---|---|---|
| 2,655,731 | 10/1953 | Sibble | 33/169 R |
| 3,368,283 | 2/1968 | Vasseur | 33/169 R |

*Primary Examiner*—Jerry W. Myracle
*Attorney, Agent, or Firm*—Imirie, Smiley & Linn

[57] ABSTRACT

Apparatus for testing the play in the linkage between the steerable dirigible wheels and the steering wheel of a vehicle comprises sensing means for engaging one of the dirigible wheels, an electric circuit including signal means, a source of electrical energy and switch means actuated by the sensing means to close the circuit and provide a detectable signal upon movement of the sensing means by displacement of the engaged wheel, and means for association with the steering wheel for indicating the amount of steering wheel travel which occurs before the detectable signal is established, thereby establishing the steering wheel play.

17 Claims, 17 Drawing Figures

3,889,527

PATENTED JUN 17 1975    SHEET    1

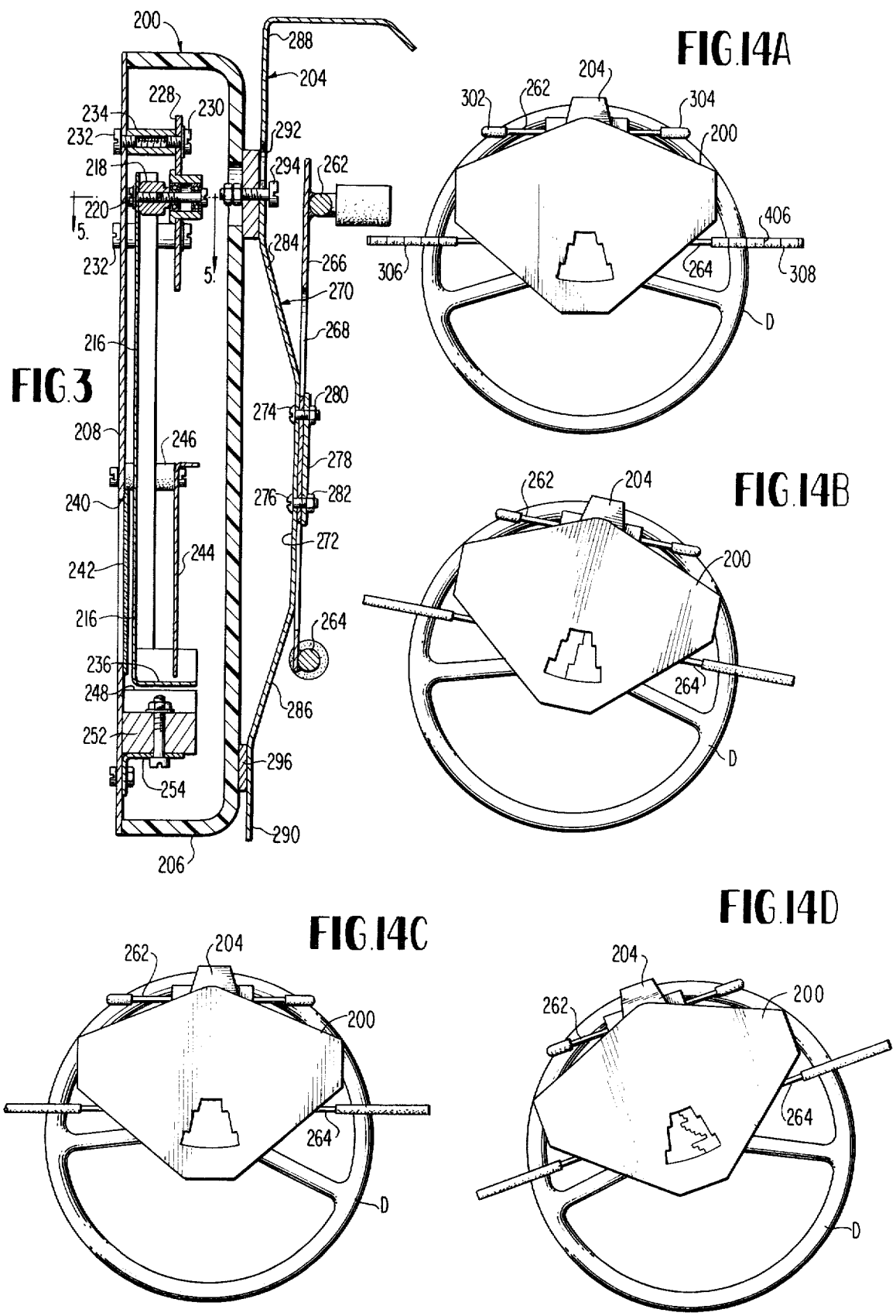

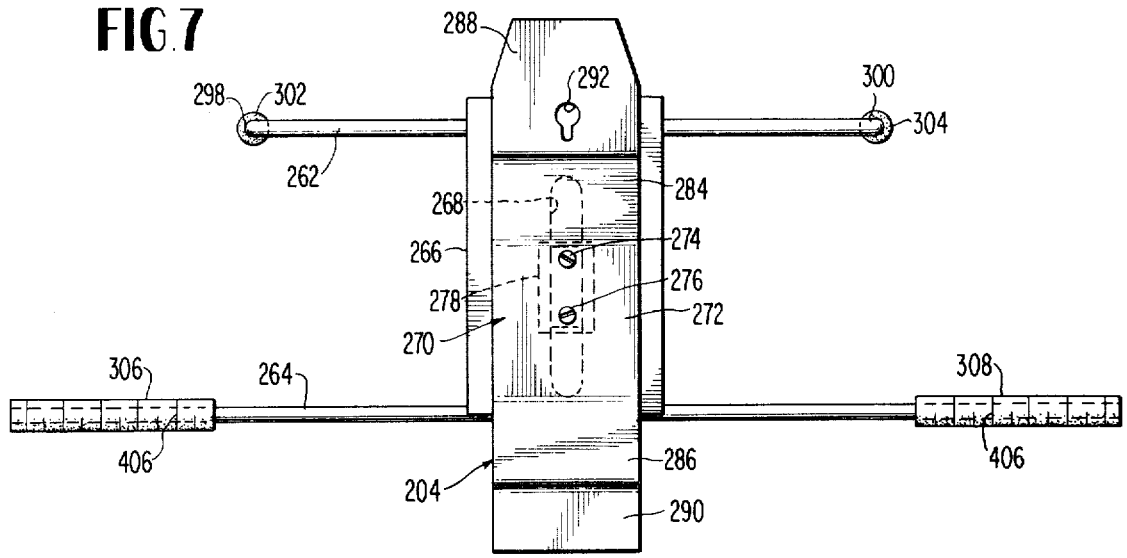
FIG.7
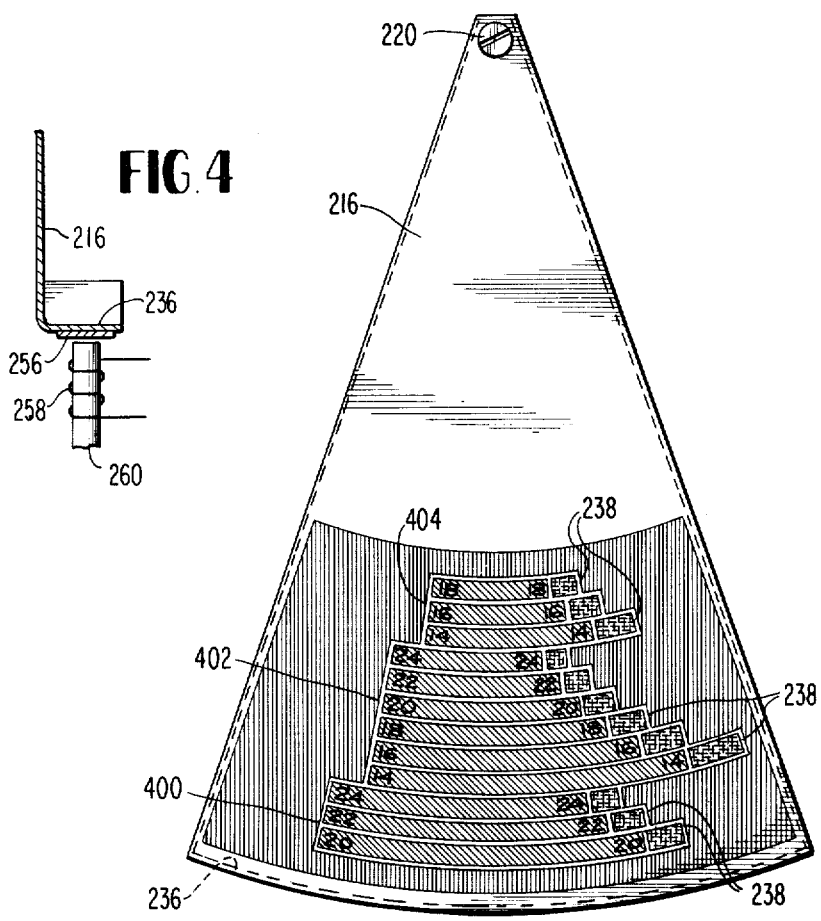
FIG.4
FIG.6

STEERING LINKAGE TESTING APPARATUS

BACKGROUND OF THE INVENTION

1. Field of the Invention

The present invention relates to testing apparatus, and more particularly to improved apparatus for testing vehicle steering linkage play.

2. Description of the Prior Art

One of the most serious, and often overlooked safety defects in motor vehicles is that of improperly adjusted steering linkage assemblies between the driver-operated steering wheel and the dirigible wheels of the vehicle. When such linkage becomes excessively loose, that is to say when an extensive amount of "play" exists between the steering and dirigible wheels, control of the steering is extremely difficult because the dirigible wheels are subject not only to driver influence but also to external influence such as by relatively minor road conditions, wind, uneven tire wear, wheel unbalance, and the like. In consequence, the vehicle may weave or wander as it travels along the road. Under such conditions it is virtually impossible for the driver to maintain accurate control over the steering of the vehicle, particularly at relatively high speeds. Moreover, accurate turning of the vehicle is extremely difficult, and may be impossible in an emergency.

In the past there has been no means for accurately determining amount of play in the steering linkage, and adjustment of the linkage has depended solely upon the feel or reaction of the mechanic effecting such adjustment. Consequently, adjustment of the linkage has been a more or less hit-or-miss proposition, that has left much to be desired.

Having recognized the fact that improper linkage adjustment has resulted in many accidents, many jurisdictions already have or are in the process of establishing rules and regulations specifically requiring that such play in the steering linkage be maintained within certain acceptable limits related to the diameter of the steering wheel of the particular vehicle. This has stimulated efforts in the design of apparatus for making a quantitative determination of the amount of play in such linkage. However, an optimum design of such an assembly has not heretofore been successfully developed.

One satisfactory assembly has been provided and is disclosed in the present inventor's copending application Ser. No. 155,641, filed June 22, 1971, now U.S. Pat. No. 3,813,932 which is a continuation of application Ser. No. 883,392, filed Dec. 9, 1969 and now abandoned. This assembly facilitates for the first time the accurate measurement of steering wheel play by sensing tire movement as well as steering wheel movement and allowing correlation therebetween. While this system has proven to be extremely effective, additional operational features such as improved accuracy and increased measurement reliability have been found to be necessary for many commercial and governmental applications.

SUMMARY OF THE INVENTION

In accordance with the present invention, apparatus is now provided, which in a simple, expeditious and dependable manner, enables rapid and accurate measurement of the free play existing between the steering and dirigible wheels of an automotive vehicle.

The present invention may be summarized in that a housing pivotally supports sensing means engageable with one of the dirigible wheels of the vehicle so that the initial turning movement of such dirigible wheel causes pivotal movement of the sensing means. An electrical circuit controlled by said means includes signal means, switch means responsive to the sensing means, and a source of electrical energy. The switch means is so coupled to the sensing means that movement of the latter closes the switch, whereupon the signal means is operated so as to apprise an operator of movement of the dirigible wheels of the vehicle. Steering wheel movement indicating means for indicating steering wheel travel is associated with the steering wheel so that an operator readily can determine the exact amount of steering wheel travel necessary to produce movement of the dirigible wheels of the vehicle. The steering wheel movement indicating means includes means carried by the steering wheel and movable therewith with respect to a fixed point relative to the vehicle.

BRIEF DESCRIPTION OF THE DRAWINGS

FIG. 3 is a cross-sectional view taken on line 3—3 of FIG. 2;

FIG. 4 is a fragmentary cross-sectional view of a detail of FIG. 3, showing a braking device which may be utilized to arrest pendulum movement;

FIG. 6 is a plan view of the pendulum element in the steering wheel movement indicating means of FIG. 2;

FIG. 7 is a plan view of the wheel hanger frame portion of the steering wheel movement indicating means of FIG. 3;

FIGS. 14A through 14D, inclusive, illustrate the manner in which the steering wheel movement indicating means is secured to a steering wheel and functions with respect thereto in the course of a testing operation.

DETAILED DESCRIPTION OF THE INVENTION

Figure 1:
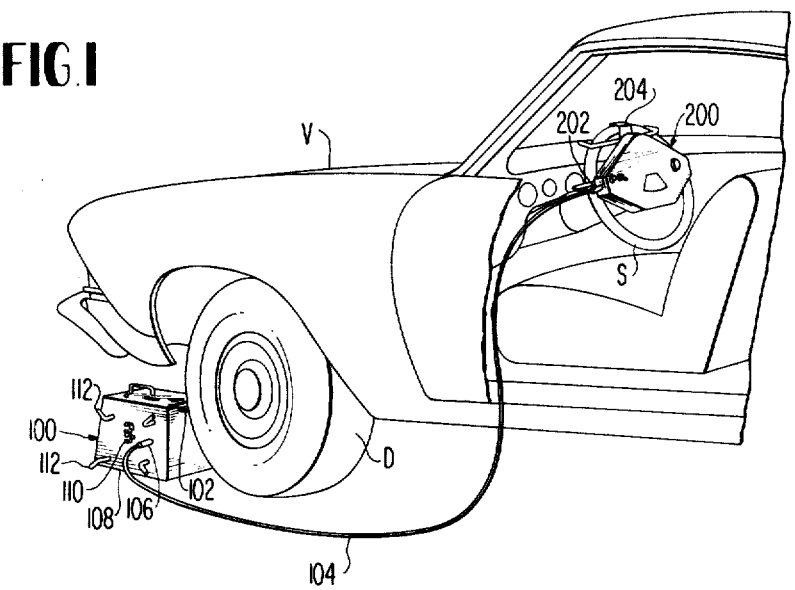
FIG. 1 is a perspective view of a portion of an automobile having a preferred embodiment of steering wheel testing apparatus, in accordance with the present invention, operatively associated therewith.
Figure 2:
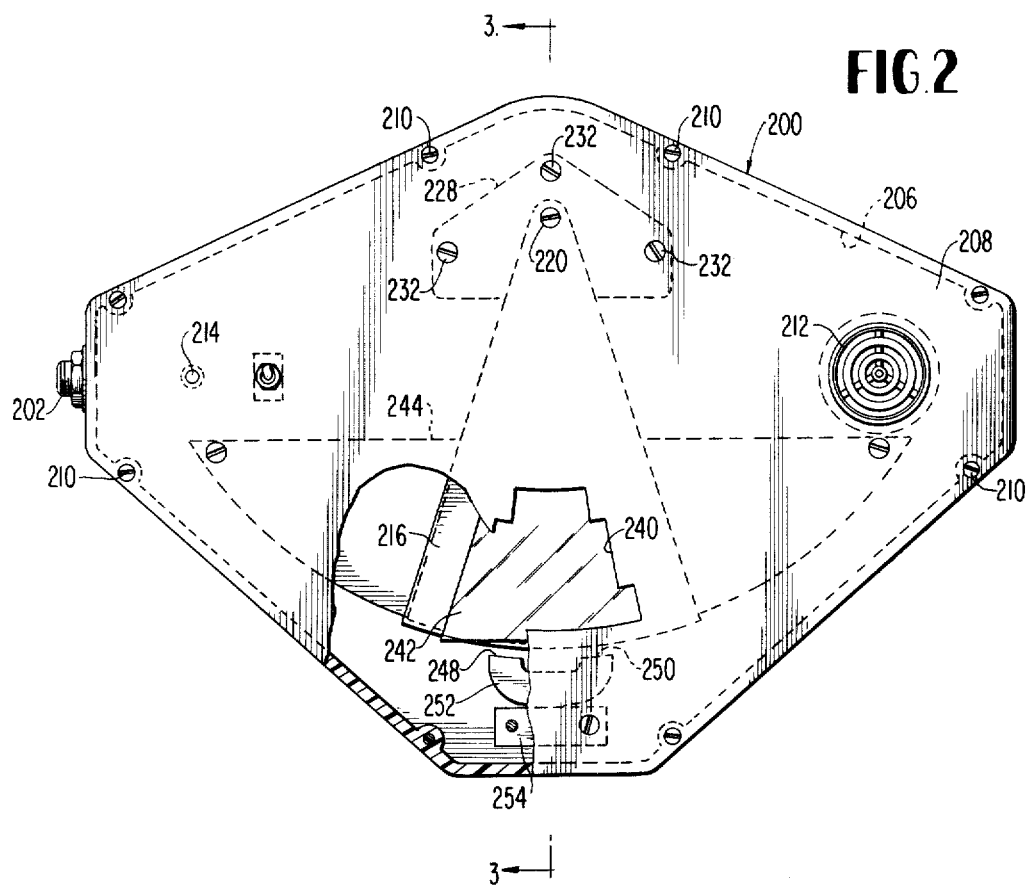
FIG. 2 is a top plan view, partially broken away, of the steering wheel movement indicating means of the apparatus of FIG. 1.
Figure 9:
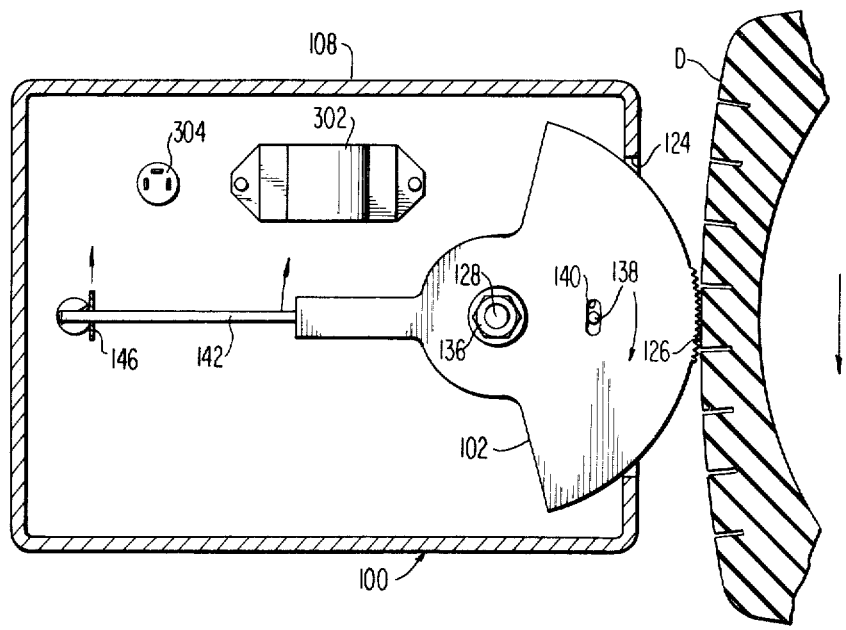
FIG. 9 is a sectional view taken on the line 9—9 of FIG. 8.
Figure 5:
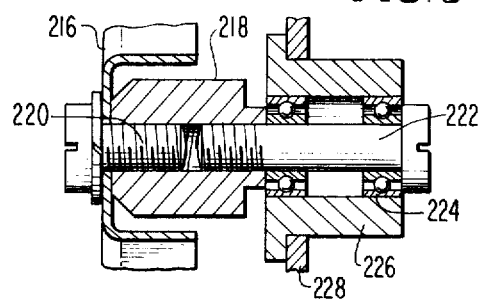
FIG. 5 is an enlarged cross-sectional view taken on line 5—5 of FIG. 3.

Referring now to the drawings wherein like reference characters designate corresponding parts throughout the several views, as seen in FIG. 1, a conventional automotive vehicle V includes a pair of dirigible wheels D at the forward end thereof. The usual steering wheel S is provided within the driver's compartment for steering and turning the dirigible wheels in a well-known manner.

The apparatus according to the present invention includes a tire movement detecting assembly 100 having a sensing member 102 which is in contact with the dirigible wheel D of the vehicle undergoing test. An electrical cable 104 extends from a suitable receptacle 106 mounted on the casing 108 of assembly 100 to a steering wheel movement indicating means 200. The cable is attached to indicating means 200 by a suitable receptacle 202. Indicating means 200 is designed to be carried upon the steering wheel S of vehicle V, as shown in FIG. 1, by a steering wheel hanger frame 204. Clips 110 and a series of winding posts 112 are provided on casing 108 for enabling storage of cable 104 when the apparatus is not in use.

Referring to FIGS. 2–5, the steering wheel indicating means 200 includes a main housing 206 to which is attached a conforming cover 208 by a series of threaded fasteners 210. Cover 208 exteriorly supports an audio signal indicator in the form of a horn 212, and is also provided with a visual signal indicator 214, which may comprise a light bulb, a light-emitting diode, or any other well known visual indicator, mounted inside the housing. At least a portion of indicator 214 is visible through a suitable aperture or the like provided at the cover 208. Within the housing 206 is disposed a pendulum element 216 which is attached at its apex to an internally threaded spacer 218 by a bolt 220. Spacer 218 is pivotally mounted about an axis defined by a second bolt 222, which is received within the spacer and is journaled for rotation within a bearing 224. A bushing 226 carrying bearing 224 is press-fit in an aperture in a generally triangular plate 228 secured to cover 208 at three points by a pair of screws 230 and 232 and a threaded spacing sleeve 234.

Pendulum 216 preferably is a pie-shaped element formed of plastic, sheet aluminum, or the like, which is inwardly bent at its lower periphery to define a rim or flange portion 236. The pendulum is suspended from its apex so that it may freely pivot about the axis defined by bolt 222. When the indicating means 200 is mounted upon a steering wheel so as to be oriented upright or substantially vertical, pendulum 216 is free to undergo side to side movements depending upon the orientation of the steering wheel. Referring to FIG. 6, indicia in the form of a plurality of scaled, curved bands 238, arranged in different groups for making measurements in connection with different diameter steering wheels, respectively, are carried on the base of the pendulum element 216. These bands may contain alphanumeric legends as well as different colored sections, on an appropriate background, for cooperation with an opening 240 in cover 208, to enable read-out of steering linkage play.

Opening 240 has stepped sidewalls coordinated with steering wheel diameter and indicia band information and is closed by a transparent window 242 of generally trapazoidal configuration. A generally crescent-shaped plate 244 is mounted on a pair of like stand-offs 246 secured to the inside of cover 208. Plate 244 has a vivid color on its face, serving as a background viewed whenever pendulum 216 swings beyond the edges of opening 240.

The rim of flange portion 236 of pendulum 216 is slightly spaced from the disposition of a pair of poles 248 and 250 of a permanent magnet 252 mounted on a bracket 254 to cover 208. Where the pendulum comprises a weakly magnetic material, such as aluminum, magnet 252 provides low order damping of the oscillations of pendulum 216. Other damping means may also be used, such as an electro-magnet which, upon actuation, brakes the pendulum to a rapid halt.

As shown in FIG. 4, such modification may, for example, be accomplished by providing on rim portion 236 a ferro-magnetic lining 256, as for example a steel band. Alternatively the entire pendulum 216 may be constructed of a ferro-magnetic material. An electromagnetic oil 258 wound about a core 260 is mounted in close proximity to lining 256 and is connected to suitable circuitry so as to receive operating potential whenever a reading is desired. Such circuitry may, for example, consist of a parallel connection across lamp 214. Upon operating potential being thus provided, rim 236 is attracted to core 260 causing slight deformation in the rim resulting in frictional contact between lining 256 and core 260, to brake the pendulum against further movement.

The steering wheel movement indicating means 200 is mounted to the steering wheel S of vehicle V by the hanger frame 204. As shown in FIGS. 3 and 7, frame 204 includes a pair of parallel crosspieces 262 and 264 secured to a rectangular, flat plate 266 which is provided with an elongated opening 268. A second elongated, rectangular plate 270 has a central portion 272 connected with plate 266 by a pair of threaded fasteners 274 and 276 which pass through elongated opening 268 and an additional small plate 278 to respective nuts 280 and 282. Plates 266 and 270 are slidably movable relative each other by loosening fasteners 274 and 276, sliding one plate upon the other, and thereafter tightening the fasteners.

Inclined portions 284 and 286 of plate 270 extend from either side of central portion 272 to top and bottom support portions 288 and 290, respectively. Top support portion 288 is generally L-shaped, as shown in FIG. 3, and cooperates with the top edge of the steering wheel S. A key hole 292 in support portion 288 allows the movement indicating means 200 to be removably attached to the frame by accommodation of the head of a screw 294 protruding from housing 206. The lower portion 290 of plate 270 is held in place by a magnitized steel plate 296 attached to the rear wall of housing 206 (FIG. 3).

It can be appreciated that by adjusting the slidable position of plate 266 with respect to plate 270, the frame 204 may be adjusted to accommodate various size steering wheels. When the appropriate adjustment is reached, the frame may be simply placed upon the uppermost portion of wheel 14 as shown in FIG. 1. A pair of turned in ears 298, 300 are provided at the opposite ends of crosspiece 262 and are covered with sleeves 302, 304 of rubber or other protective material. These ears rest over the rim of the wheel when the frame is in place so as to properly, centrally locate the same. A pair of similar rubber sleeves 306, 308 are provided at the opposite ends of crosspiece 264, which sleeves rest upon the rim of wheel 14 under the force of gravity.

Referring now to FIGS. 8–12, the tire movement detecting assembly 100 includes a base plate 114, supporting casing 108 and having at least one pair of rubber or other non-skid feet 116 disposed on the bottom side thereof away from tire D. In this manner, the weight of the assembly causes the sensing member 102 to engage and accurately monitor tire movement. A handle 118 is attached to the top of casing 108 for convenience in carrying, and a battery 120 is mounted inside the casing on a wall thereof by a bracket 122 for supplying operating potential to the system. Alternatively, such operating potential may be derived directly from the vehicle under test by an appropriate set of cables (not shown).

Sensing member 102 is shaped in part as the sector of a circle, such sector protruding from a horizontal, elongated opening 124 provided at the front of casing 108. The outermost edge of the sensing means is provided with serrations 125 for frictional engagement of the protruding portion of the sensing member with the edge of tire D. The sensing member 102 is pivotable about a vertical axis defined by a bolt 128 (FIG. 11) extending through the top of the casing 108. A pair of collars 130 and 132 are positioned on either side of a bearing 134 and are held in place by a nut 136. Bearing 134 supports member 102 such that the same is free to rotate in a horizontal plane. A second bolt 138 is threadedly received in the top of casing 108 which protrudes downwardly through an arcuate slot 140 in sensing member 102 adjacent its center of rotation. Bolt 138 and slot 140 cooperate to limit the extent of rotation of member 102 to prevent damage to the remaining elements, to be described below.

Figure 10:
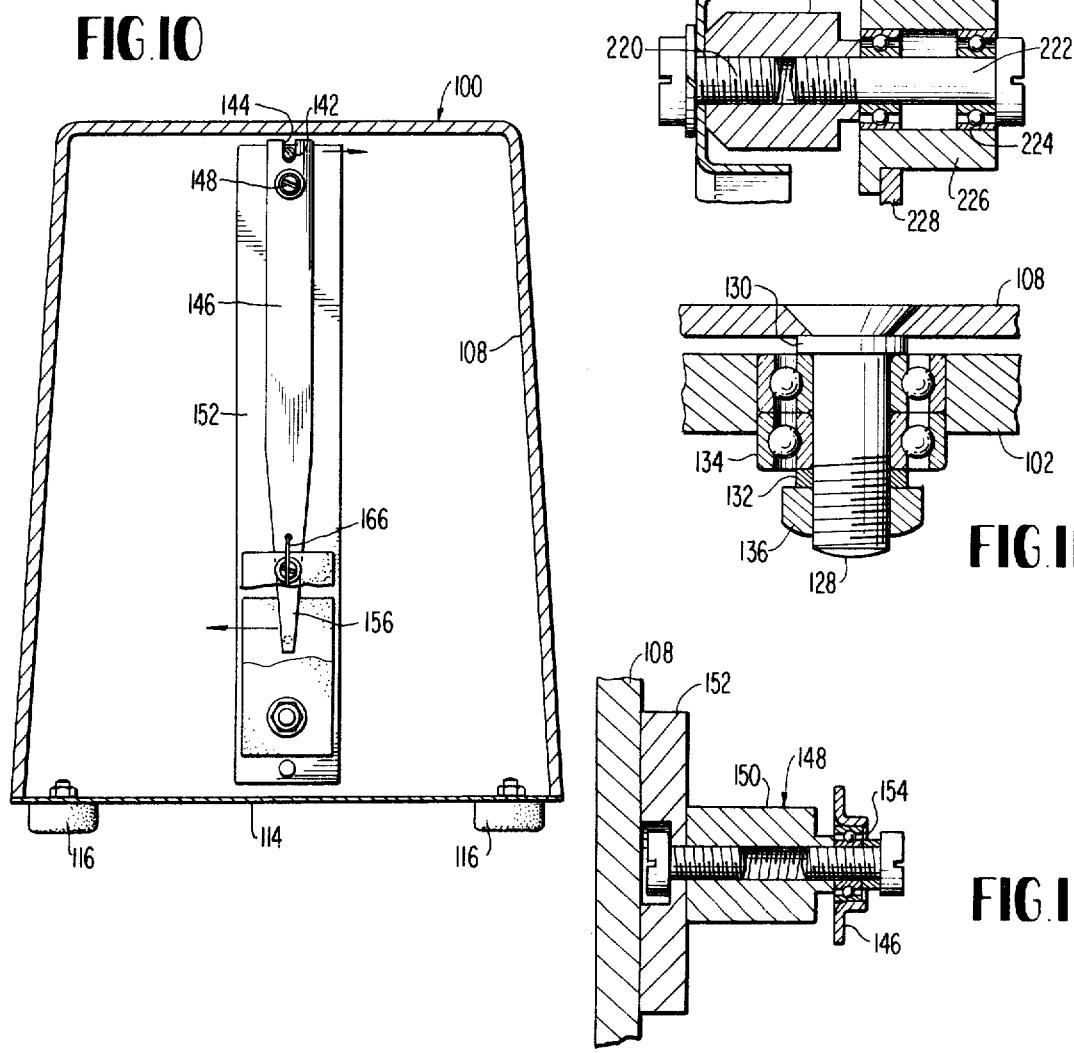
FIG. 10 is a sectional view taken on line 10—10 of FIG. 8.
Figure 11:
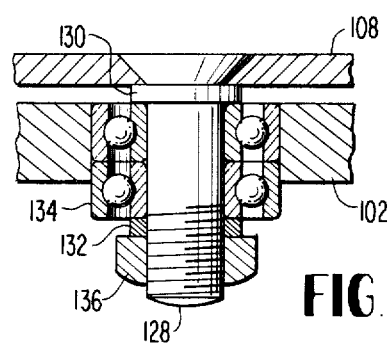
FIG. 11 is a detail cross-sectional view taken on line 11—11 of FIG. 8.
Figure 12:
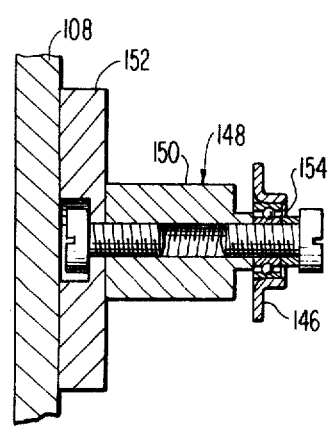
FIG. 12 is a detail cross-sectional view taken on line 12—12 of FIG. 8.
Figure 8:
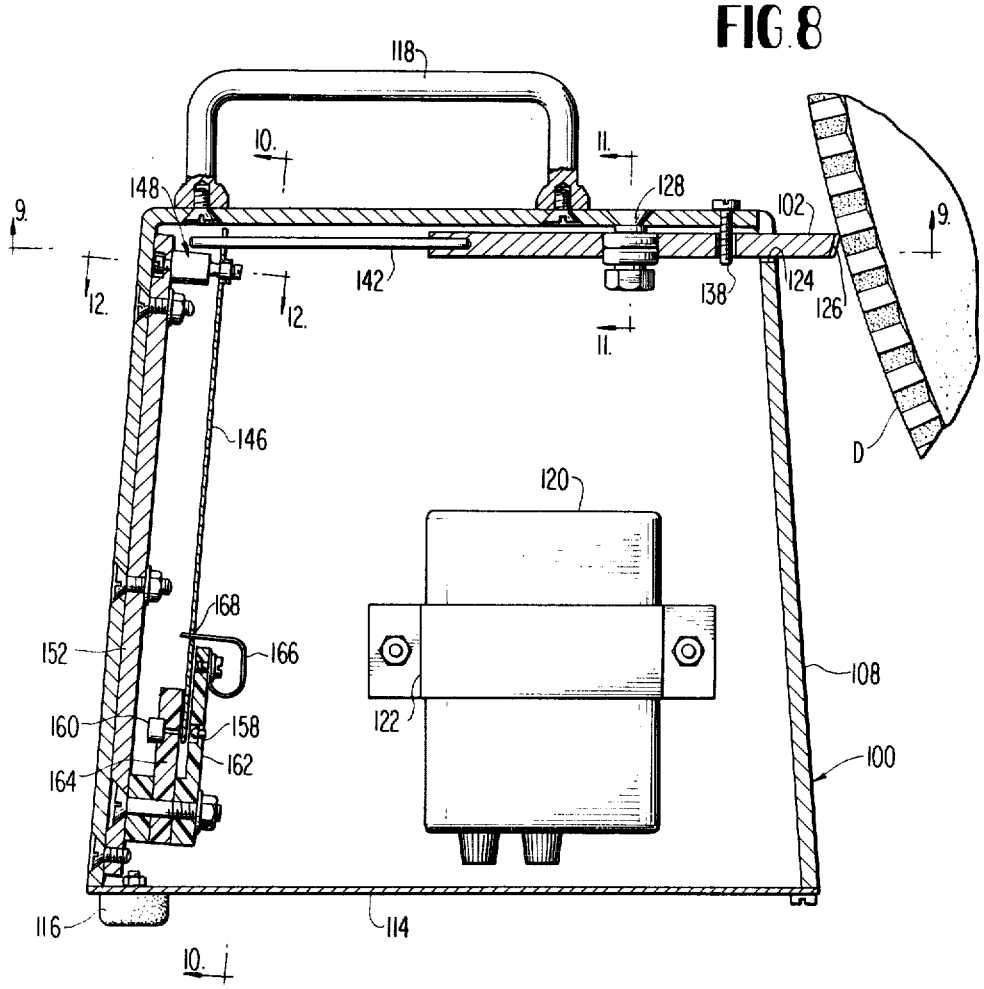
FIG. 8 is a sectional view of the dirigible wheel movement sensing means of the apparatus of FIG. 1.

A linkage arm 142 extends from the interior end of sensor 102, the distal end of arm 142 being accommodated within a slot 144 defined at the upper end of a shutter blade 146 (FIG. 10). Shutter blade 146 is pivoted near its upper end about a pivot assembly 148 including a spacer 150 (FIG. 12) bolted to a mounting plate 152 at one end and to a bearing 154 at the other end. Bearing 154 carries blade 146 for free rotation under the force transmitted from sensing member 102 by link arm 142. Because of the respective pivots points of sensing element 102 and shutter blade 146, it can be appreciated that a very minute movement of the sensing element will introduce a relatively large degree of angular displacement of the distal end 156 of the shutter blade.

As shown in FIG. 10, the distal end 156 of shutter blade 146 is preferably tapered and traverses an arcuate path intercepting the light path of a lamp 158 and a photodiode 160. Lamp 158 and photodiode 160 may be mounted in any suitable manner such as on spaced, insulated supports 162 and 164, respectively, attached to mounting plate 152 by a nut and bolt. A coiled spring element 166 is mounted on the top of support 162 and partially protrudes through a hole 168 in blade 146 to bias the end of the blade to a central position between lamp 158 and photodiode 160. As will be more fully discussed below, movement of tire D causes blade 146 to move out of the light path between lamp 158 and photodiode 160 such that an alarm signal may be produced to apprise an operator of such condition. Of course, when no movement occurs, blade 146 remains interposed in the light path whereupon no alarm or warning signal will be generated.

Figure 13:
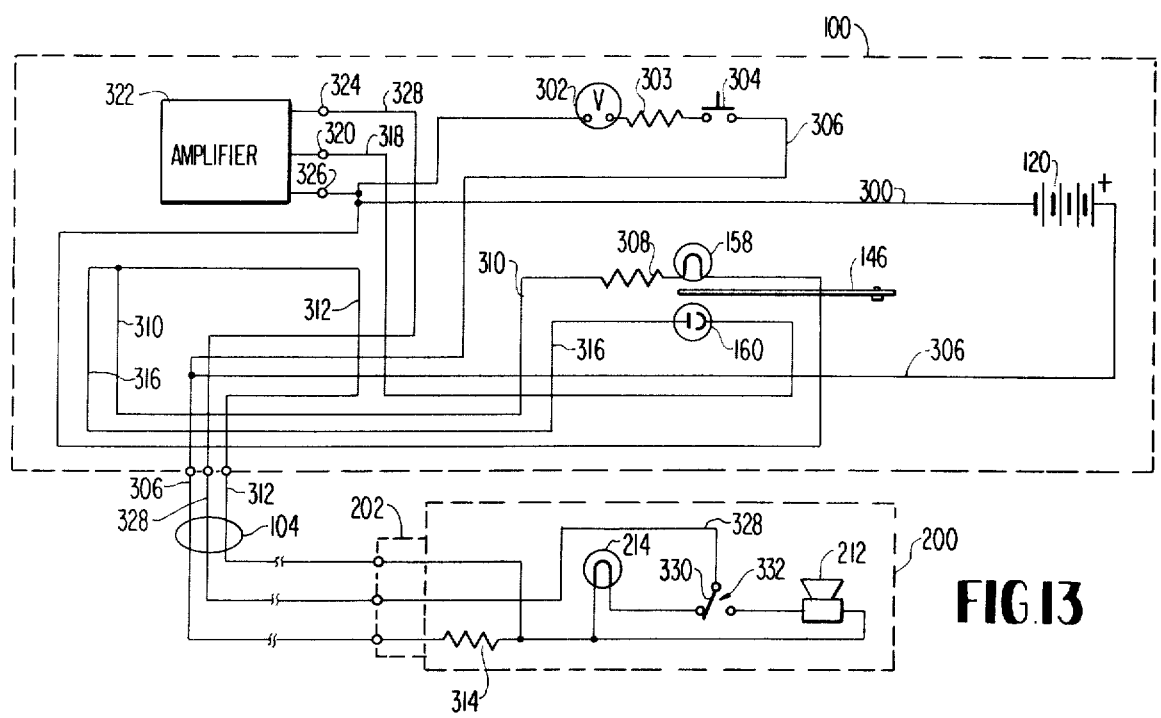
FIG. 13 is a schematic diagram of the electrical circuit in the apparatus of FIG. 1.

A schematic diagram of the electrical circuit of the present invention is shown in FIG. 13. The circuit is divided into two basic portions, one located within tire detecting assembly 100 and the other in steering wheel movement indicating means 200. The two sections are shown as being diagrammatically disposed in the respective assemblies, interconnected by the three-wire cable 104.

Battery 120, which, for example may be a six volt battery, has its negative terminal connected by a conductor 300 to one side of a voltmeter 302, the opposite side of which is coupled in series with current-limiting resistor 303 and a normally open pushbutton switch 304 to a conductor 306 leading to the positive terminal of the battery. Voltmeter 302 and switch 304 may be mounted in the top of casing 108 (FIG. 9) so that when it is desired to establish the condition of battery 120, it is only necessary to press switch 304 and observe the indicated potential on the meter 302.

Negative conductor 300 is also connected to one side of lamp 158, the opposite terminal of which is coupled through limiting resistor 308 and lead 310 to a positive return conductor 312. Conductor 312 receives positive potential from battery 120 by the interconnection of conductor 306 over cable 104 with a limiting resistor 314. Thus, whenever cable 104 is plugged into receptacle 202 of the steering movement assembly 200, the system is automatically activated, without the need for an additional off-on switch.

Positive return conductor 312 is also connected to feed operating potential via line 316 to photodiode 160. The other side of the photodiode is coupled by a lead 319 to an input terminal 320 of an amplifier 322 which may be of any suitable type, such as a solid state module, and which responds to the signal received from photodiode 160 and generates an output on terminal 324. Preferably, amplifier 322 is connected to ground or negative conductor 300 via terminal 326 and causes output terminal 324 to become grounded whenever the optical path between lamp 158 and photodiode 160 is broken.

Output 324 of amplifier 322 is fed via line 328 to a movable contact 330 of a single-pole-double-throw switch 332 that has two fixed contacts respectively connected over lines 334 and 336 to horn 212 and lamp 214 in the front panel of sensing means 200. The other terminals of horn 212 and lamp 214 are connected to resistor 314 to receive positive potential from battery 120. Depending upon the position of the movable contact 330 of switch 332, either the visual indicator 214 or the horn signal 214 will be activated. It should be appreciated that while an optical sensing switch has been illustrated and described herein, any suitable switching assembly may also be provided to generate an output signal in response to tire movement.

In operation, initially vehicle V is brought to rest with tires D facing approximately forward. Assembly 100 is then positioned adjacent wheel D so that sensing member 102 is in firm contact with the tire tread. Steering wheel means 200 is then mounted on the steering wheel S, as described above, such that the crosspiece 194 is approximately horizontal, as shown in FIG. 14A. Referring to FIG. 6, the indicia provided on pendulum 216 include three index lines 400, 402 and 404, which are stepped inwardly with respect to one another. By slightly adjusting the angular orientation of sensing assembly 200, on the steering wheel S, one may align the index lines 400, 402 and 404 with the stepped corresponding edge of opening 240.

To start the test, an operator need only plug cable 104 into receptacle 202, and the system is automatically turned "on." The operator performing the test then slowly rotates the steering wheel in one direction.

Since the dirigible wheel 12 will not actually begin to move until the play in the linkage between steering wheel and dirigible wheel is taken up, an indication by lamp 214 or horn 212 (as selected by switch 332) will only occur after an initial amount of steering wheel rotation, approximately to the position shown in FIG. 14B. This represents the end point of one end of the free play range or lash. Then, by holding the steering wheel, the operator readjusts the position of means 200 upon wheel S until pendulum index lines 400, 402 and 404 are again lined-up, as shown in FIG. 14C.

To now evaluate the full degree of free play, the operator merely rotates the steering wheel S in the opposite direction and upon doing so the signal from horn 212 or lamp 214 will first cease as the sensing means in contact with wheel S passes through its neutral position, and then will be reenergized. The point at which such indication is registered, as shown in FIG. 14D, represents the steering wheel play or lash which had to be taken up before the movement was produced.

It will be evident from a consideration of the foregoing operation that the pendulum 216, which is gravity responsive, has now registered the angular steering wheel displacement between the ends of the free-play or lash zone of the steering linkage of the vehicle. The pendulum is thus displaced in a counterclockwise direction from its initial position to a degree which is a function of the free play range which may be accurately determined by examining the indicia corresponding to one of three bands and appearing through opening 240.

The respective stepped bands of indicia, together with the associated edges of opening 240, are intended to be respectively used in accordance with the specific free play limitations set forth by the regulations of the jurisdiction in which the test result is to be applied. For example, as visualized in FIG. 14A, the bottom set of indicia (See FIG. 6 as well) may be associated with measurements to be conducted in a jurisdiction wherein 4 inches of free play is permitted. By examining FIG. 6 it is seen that three parallel bands are provided in the lower group associated respectively with 20, 22 and 24 inch steering wheels. These several tracks at their left portions are preferably distinctively colored, as for example, green, to designate that should the left edge of opening 240 overly such green portion of the appropriate band (when the condition of FIG. 14D is attained), the vehicle tested is within acceptable linkage play limitations. The right portions may be colored yellow to indicate a borderline or close-to-danger condition, and the background may be colored red to indicate that the test establishes a degree of play exceeding acceptable limitations. The other group of bands closer to the apex of pendulum 216 are utilized in a similar fashion wherever a lesser degree of play or lash is permissible between steering and dirigible wheels.

A scale 406 (FIGS. 7 and 14A) may be provided on the sleeves 306 and/or 308 of cross member 264 to facilitate the selection of the proper pendulum band 238. When appropriately mounted on steering wheel S, scale 406 provides a direct readout of steering wheel diameter so that a separate measurement step is eliminated.

Thus, is can be appreciated that by employing the apparatus according to the present invention, accurate measurements of the degree of steering linkage freeplay or lash are facilitated with minimal operator training and with reliability necessary for use in complying with legal inspection standards.

Inasmuch as the present invention is subject to many variations, modifications, and changes in detail, it is intended that all matter contained in the foregoing description or shown in the accompanying drawings shall be interpreted as illustrative and not in a limiting sense.

The embodiment of the invention in which an exclusive property or privilege is claimed are defined as follows:

1. Apparatus for use in testing play in the mechanism connecting the steering wheel and the steerable road wheels of a vehicle, comprising a support to be disposed on the road wheel supporting surface adjacent one of the road wheels, sensing means movably supported by said support and engagable with the respective road wheel for sensing movement by the wheel, circuit means in said support responsive to said sensing means for producing a signal, steering wheel movement indicating means mountable at least on the steering wheel for indicating steering wheel travel, and indicator means on said steering wheel movement indicating means connected to said circuit means for generating an alarm in response to said signal upon initial movement of said sensing means by the road wheel.

2. Apparatus in accordance with claim 1, wherein said steering wheel movement indicating means includes a housing securable to the steering wheel and movable therewith, said housing carrying a gravity responsive pendulum element pivotably mounted therein and displaceable with respect to said housing, said pendulum cooperating with said housing to provide an indication of said steering wheel travel.

3. Apparatus according to claim 2 wherein said pendulum element is disposed interiorly of said housing, and wherein said housing defines an opening through which the position of said pendulum may be observed.

4. Apparatus in accordance with claim 2, further including damping means on said steering wheel movement indicating means for damping the oscillations of said pendulum element about an equilibrium position.

5. Apparatus in accordance with claim 4 wherein said damping means comprises a magnet disposed in fixed position adjacent said pendulum, and wherein said pendulum comprises a metallic material.

6. Apparatus in accordance with claim 5, wherein said magnet comprises an electromagnet disposed in close proximity with said pendulum, and said pendulum includes ferromagnetic material whereby activation of said electromagnet causes slight deformation of said pendulum into contact with said electromagnet to brake said pendulum.

7. Apparatus according to claim 2 wherein said pendulum carries indicia in the form of a plurality of arcuate bands arranged in radially displaced groups circumferentially offset from each other.

8. Apparatus in accordance with claim 1, wherein said steering wheel movement indicating means includes a hanger frame for enabling attachment of said movement indicating means to the steering wheel.

9. Apparatus in accordance with claim 8 wherein said hanger frame is adjustable for accommodating steering wheels of different diameters.

10. Apparatus in accordance with claim 8 wherein said hanger frame includes scale means for coaction with the steering wheel to which said frame is mounted to indicate steering wheel diameter.

11. Apparatus in accordance with claim 1, wherein said circuit means includes an optical switch comprising a light source and a photo sensor; and wherein said sensing means is linked to a shutter blade intercepting the optical path between said photo sensor and light source and movable out of said optical path by said dirigible wheel.

12. Apparatus according to claim 11 wherein said sensing means comprises a pivotally movable element having a serrated, tire-engaging portion and carrying an interconnecting linkage arm, said shutter blade being engaged by said linkage arm for movement thereby.

13. Apparatus according to claim 12 wherein said shutter blade is spring biased to a position interrupting said optical path.

14. Apparatus according to claim 11 wherein said shutter blade has a tapered end disposed in said optical path whereby slight movement of said blade allows light from said lamp to impinge upon said photo sensor.

15. Apparatus according to claim 1 wherein said circuit means comprises input means adapted to be connected to a source of operating potential, and switch means connected to said input means and responsive to initial road wheel movement sensed by said sensing means; and wherein said indicator means comprises an alarm device connected to receive operating potential from said input means through said switch means.

16. Apparatus according to claim 15 wherein said indicator means comprises a horn and a lamp connected by a selector switch to said switch means.

17. Apparatus for use in testing play in the mechanism connecting the steering wheel and the steerable dirigible wheels of a vehicle, comprising a housing to be disposed on the road wheel supporting surface adjacent one of the dirigible wheels, sensing means movably supported by said housing and engagable with said one dirigible wheel, signal means operated by movement of said sensing means to signal initial movement of said one dirigible wheel engaged by said sensing means, steering wheel movement indicating means mountable at least on the steering wheel for indicating steering wheel travel upon activation of said signal means, and said signal means including indicator means on said steering wheel movement indicating means for generating a perceptible warning alarm upon activation of said signal means.

* * * * *